United States Patent
Ramalingam et al.

(10) Patent No.: US 9,361,457 B1
(45) Date of Patent: *Jun. 7, 2016

(54) USE OF DECOY DATA IN A DATA STORE

(71) Applicant: Amazon Technologies, Inc., Seattle, WA (US)

(72) Inventors: Harsha Ramalingam, Kirkland, WA (US); Timothy Mark Edward Bollefer, Monroe, WA (US); Dominique I. Brezinkski, Seattle, WA (US); Jesper M. Johansson, Redmond, WA (US); James C. Petts, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,143

(22) Filed: Feb. 6, 2015

Related U.S. Application Data

(63) Continuation of application No. 13/602,466, filed on Sep. 4, 2012, now Pat. No. 8,955,143.

(51) Int. Cl.
| | |
|---|---|
| *G06F 21/00* | (2013.01) |
| *H04L 29/06* | (2006.01) |
| *G06F 21/56* | (2013.01) |
| *G06F 17/30* | (2006.01) |
| *H04L 12/66* | (2006.01) |
| *G06F 13/00* | (2006.01) |

(52) U.S. Cl.
CPC .......... *G06F 21/56* (2013.01); *G06F 17/30864* (2013.01); *G06F 2221/034* (2013.01)

(58) Field of Classification Search
CPC .............. G06F 21/56; G06F 17/30864; G06F 2221/034
See application file for complete search history.

(56) References Cited

U.S. PATENT DOCUMENTS

| | | | |
|---|---|---|---|
| 8,549,643 B1* | 10/2013 | Shou ..................... | G06F 21/556 455/410 |
| 2009/0204813 A1* | 8/2009 | Kwan ..................... | G06F 21/64 713/161 |

FOREIGN PATENT DOCUMENTS

| | | | |
|---|---|---|---|
| JP | 200732593 A | | 12/2007 |
| JP | 2013240114 A | * | 11/2013 |

OTHER PUBLICATIONS

Brian M. Bowen, Vasileios P. Kemerlis, Pratap Prabhu, Angelos D. Keromytis, Salvatore J. Stolfo; "Automating the injection of believable decoys to detect snooping"; Mar. 2010; WiSec '10: Proceedings of the third ACM conference on Wireless network security; Publisher: ACM; pp. 81-86.*

Jordan, C.J.; Zhang, Q.; Roves, J.; "Determining the strength of a decoy system: a paradox of deception and solicitation"; Information Assurance Workshop, 2004; Proceedings from the Fifth Annual IEEE SMC; Publication Year: Jun. 2004; pp. 138-145.

Defense Advanced Research Projects Agency (Department of Defense). Anomaly Detection at Multiple Scales (ADAMS). http://publicintelligence.net/darpa-fog-computing/ Accessed Sep. 18, 2013.

Shachtman, Noah. Feds Look to Fight Leaks with 'Fog of Disinformation'. Wired Magazine, Jul. 3 2012. Online content: http://www.wired.com/dangerroom/2012/07/fog-computing/. Accessed Sep. 18, 2013.

\* cited by examiner

*Primary Examiner* — Andrew Nalven
*Assistant Examiner* — Courtney Fields
(74) *Attorney, Agent, or Firm* — Thomas | Horstemeyer, LLP

(57) ABSTRACT

Disclosed are various embodiments for identifying a table of non-decoy data matching a set of criteria. Decoy data is inserted into the table of non-decoy data. The decoy data is detected in a result comprising the decoy data, the result generated in response to an access of the data store. An alarm is generated based at least upon the result.

20 Claims, 4 Drawing Sheets

USE OF DECOY DATA IN A DATA STORE

CROSS-REFERENCE TO RELATED APPLICATIONS

This application is a Continuation of and claims priority to U.S. application Ser. No. 13/602,466 titled "Use of Decoy Data in a Data Store", filed Sep. 4, 2012, which is incorporated herein by reference in its entirety.

BACKGROUND

In an age of information, data stores to store and access information are ubiquitous. Some information may be confidential with only a limited number of parties granted access to the information. However, identifying unauthorized access or use of the information may not always be possible.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to techniques for identifying potentially malicious activity through automated placement of decoy data into a response to an access of a data store and detection of the decoy data in locations other than where it was placed. Various criteria may be used to select the locations for placement of the decoy data, while the decoy data itself may be predefined or generated based on a set of encoding rules using, for example, steganographic and/or cryptographic techniques. Signature data may be created to concisely describe the decoy data, which may then be distributed to one or more sentinels to begin examination. The sentinels may detect the decoy data based on comparison of the signature data with the data under examination. Various actions may be undertaken upon detection of decoy data that may be based upon the particular decoy data detected, as well as the role and location of the detecting sentinel. In the following discussion, a general description of the system and its components is provided, followed by a discussion of the operation of the same.

Figure 1:
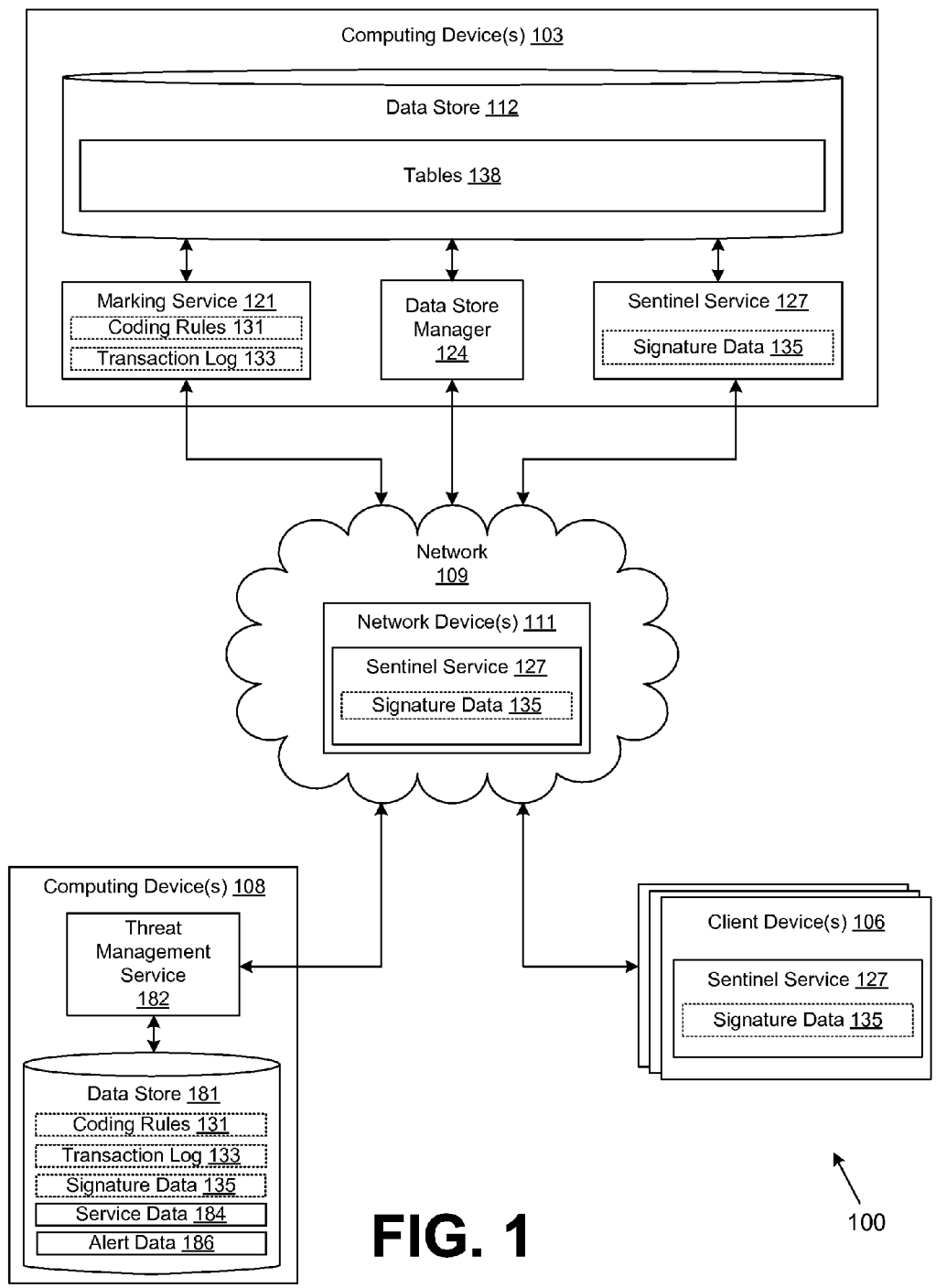
FIG. 1 is a drawing of a networked environment according to various embodiments of the present disclosure.

With reference to FIG. 1, shown is a networked environment 100 according to various embodiments. The networked environment 100 includes a computing device 103 in data communication with one or more clients 106 and a computing device 108 by way of the network 109. The network 109 includes, for example, the Internet, intranets, extranets, wide area networks (WANs), local area networks (LANs), wired networks, wireless networks, or other suitable networks, etc., or any combination of two or more such networks. Data communication transiting the network 109 may be forwarded and/or examined by a network device 111.

The computing device 103 may comprise, for example, a server computer or any other system providing computing capability. Alternatively, the computing device 103 may comprise a plurality of servers or other computing devices that are arranged, for example, in one or more server banks or computer banks or other arrangements. For example, the computing device 103 may comprise a cloud computing resource, a grid computing resource, and/or any other distributed computing arrangement. The computing device 103 may be located in a single installation or may be distributed among many different geographical locations.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. As a non-limiting example, the data store 112 may comprise one or more relational databases, object oriented databases, document oriented databases, and/or other types of data stores as can be appreciated. The data stored in the data store 112, for example, is associated with the operation of the various applications and/or functional entities described below.

The components executed on the computing device 103, for example, include a marking service 121, a data store manager 124, a sentinel service 127, and other applications, services, processes, systems, engines, or functionality not discussed in detail herein. The marking service 121 is executed in order to facilitate identifying and/or creating tables within the data store 112 and including decoy data in responses to access of the given tables. To this end, the marking service 121 may insert the decoy data into the table to be included in responses, and/or the marking service 121 may insert decoy data only into the responses without insertion into the table. Despite the organizational view of tables stored as rows and columns, the data values may be stored in a different structure suitable for the particular data store 112. The decoy data may include the addition of data to the pre-existing data of a table and/or response, as well as potential modifications to the pre-existing data. As a non-limiting example, the modifications may include, for example, digital watermarks, steganography, cryptography, and/or other techniques for marking data as can be appreciated. In some embodiments, the marking service 121 may include coding rules 131, transaction log 133, and/or other possible data.

The coding rules 131 comprise rules for identifying and/or creating tables within the data store 112 for marking, as well as the type of marking to be performed for a given table. The transaction log 133 comprises data associated with historical modifications of the tables 138 and/or responses made by the marking service 121. For a given table modified by the marking service 121, the transaction log 133 may include an identifier for a modified table, an identifier for one or more attribute types (e.g. columns) of decoy data inserted into the table, an identifier for one or more records (e.g. rows) of decoy data inserted into the table, decoy data values inserted, a time stamp for the access, authentication credentials associated with the access, and/or other data associated modifications to tables by the marking service 121.

The data store manager 124 is executed in order to facilitate creation, maintenance, and use of one or more tables within the data store 112. The data store manager 124 may support query languages or other types of "access" languages to specify criteria with which to report, insert, modify, and/or delete data values associated with the tables. The data store manager 124 may further provide facilities for controlling data access, enforcing data integrity, managing concurrency control, as well as maintaining database security. In some embodiments, the data store manager may further offer an application programming interface (API) or other programmatic interface through which applications and/or "plug-in" program modules may interface with the data store manager to extend features and functionality.

The sentinel service 127 is executed in order to facilitate identifying the presence of decoy data located outside of the tables of the data store 112. The decoy data may be identified based upon a comparison with portions of the signature data 135. The signature data 135 may contain various types of information that may be employed to positively identify a given piece of data as being decoy data. As a non-limiting example, the signature data 135 may comprise text strings, checksums, hash values, metadata, decoding rules, and/or other types of identification data as can be appreciated. In some embodiments, the signature data 135 may further specify actions to be taken in response to decoy data based upon the particular decoy data detected, the computing device in which the sentinel service 127 is executing, and/or other possible criteria.

The sentinel service 127 may examine data present in memory, in a table of the data store 112 other than where it was placed, stored in non-volatile storage, transiting a network interface, and/or other locations of the computing device in which the sentinel service is executing, such as the computing device 103. The sentinel serve 127 may communicate with the computing device 108 and/or other computing devices using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 109.

The data stored in the data store 112 includes, for example, tables 138, and potentially other data. Each table in the tables 138 is a set of data values organized using a model of vertical columns and horizontal rows, wherein a table has a specified number of columns, but may have any number of rows. The types of data values represented in the tables 138 may include customer records, payment information, payment instruments (e.g., credit card information, debit card information, gift card information, prepaid card information, and stored value account information), confidential information, personally identifiable information, order histories, user credentials, salary information, sales information, gift certificates, web browser cookies, music, medical information, and/or other data as can be appreciated. Each of the tables 138 generally has associated metadata, such as constraints on the table and/or on the values within particular columns, descriptors for the table and/or columns, or other metadata as can be appreciated. Despite the organizational view of tables 138 stored as rows and columns, the data values may be stored in a different structure suitable for the data store 112.

The client 106 is representative of a plurality of client devices that may be coupled to the network 109. The client 106 may comprise, for example, a processor-based system such as a computer system. Such a computer system may be embodied in the form of a desktop computer, a server, a laptop computer, a personal digital assistant, a cellular telephone, set-top box, music players, web pads, tablet computer systems, game consoles, or other devices with like capability.

The client 106 may be configured to execute various applications such as a sentinel service 127 and/or other applications. The sentinel service 127, as executed in the client 106, is executed in order to facilitate identifying the presence of decoy data. The decoy data may be identified based upon a comparison with portions of the signature data 135. The signature data 135 may contain various type of information that may be employed to positively identify a given piece of data as being decoy data. As a non-limiting example, the signature data 135 may comprise text strings, checksums, hash values, metadata, decoding rules, and/or other types of identification data as can be appreciated.

The sentinel service 127 may examine data present in memory, stored in non-volatile storage, transiting a network interface, and/or other locations of the computing device in which the sentinel service is executing, such as the client device 106. The sentinel serve 127 may communicate with the computing device 108 and/or other computing devices using various protocols such as, for example, HTTP, SOAP, REST, UDP, TCP, and/or other protocols for communicating data over the network 109. The client 106 may be configured to execute applications beyond the sentinel service 127 such as, for example, a browser application, email applications, instant message applications, and/or other applications.

The computing device 108 may comprise, for example, a server computing device or any other system providing computing capability. Alternatively, a plurality of computing devices 108 may be employed that are arranged, for example, in one or more computer banks or other arrangements. For example, a plurality of computing devices 108 together may comprise a cloud computing resource, a grid computing resource, and/or any other distributed computing arrangement. Such computing devices 108 may be located in a single installation or may be distributed among many different geographical locations. For purposes of convenience, the computing device 108 may be referred to herein in the singular. Even though the computing device 108 is referred to in the singular, it is understood that a plurality of computing devices 108 may be employed in the various arrangements as described above.

Various applications and/or other functionality may be executed in the computing device 108 according to various embodiments. Also, various data is stored in a data store 181 that is accessible to the computing device 108. The data store 181 may be representative of a plurality of data stores 181 as can be appreciated. The data stored in the data store 181, for example, is associated with the operation of the various applications and/or functional entities described below.

The components executed on the computing device 108, for example, include a threat management service 182, and other applications, services, processes, systems, engines, or functionality not discussed in detail herein. The threat management service 182 may correspond to a management application for the marking service 121 and the sentinel service 127. To that end, the threat management service may communicate with the marking service 121 and the sentinel service 127 over various protocols such as, for example, HTTP, SOAP, REST, UDP, TCP, and/or other protocols for communicating data over the network 109. The threat management service 182 may also present a user interface accessible through a web browser and/or other applications on the client 106 or other computing device.

The data stored in the data store 181 includes, for example, coding rules 131, a transaction log 133, signature data 135, service data 184, alert data 186, and potentially other data. The coding rules 131 comprise rules for identifying and/or creating tables within the data store 112 for marking, as well as the type of marking to be performed for a given table. The transaction log 133 comprises data associated with historical modifications of the tables 138 and/or responses made by the marking service 121. The signature data 135 may contain various types of information that may be employed to positively identify a given piece of data as being decoy data. As a non-limiting example, the signature data 135 may comprise text strings, checksums, hash values, metadata, decoding rules, and/or other types of identification data as can be appreciated.

The service data 184 may comprise identifiers and authentication data associated with various deployed instances of the marking service 121 and the sentinel service 127. The service data 184 may further comprise network location information and/or priority information for the computing devices on which instances of the marking service 121 and/or the sentinel service 127 are executing. The alert data 186 may comprise a set of alerts as reported by the deployed instances of the sentinel service 127. The alerts may comprise an identifier for the computing device on which the sentinel service is executing, the decoy data detected, where it was detected, the action attempted, result of the attempted action, and/or other possible data related to the incident as can be appreciated.

The network device 111 is representative of a plurality of network devices that may forward and/or examine communication data transiting the network 109. The network device 111 may comprise, for example, a processor-based system such as a computer system. Such a computer system may be embodied in the form of a server, network router, a network switch, a network proxy, or other devices with like capability.

The network device 111 may be configured to execute various applications such as a sentinel service 127 and/or other applications. The sentinel service 127, as executed in the network device 111, is executed in order to facilitate identifying the presence of decoy data. The decoy data may be identified based upon a comparison with portions of the signature data 135. The signature data 135 may contain various type of information that may be employed to positively identify a given piece of data as being decoy data. As a non-limiting example, the signature data 135 may comprise text strings, checksums, hash values, metadata, decoding rules, and/or other types of identification data as can be appreciated.

The sentinel service 127 may examine data present in memory, stored in non-volatile storage, transiting a network interface, and/or other locations of the computing device in which the sentinel service is executing, such as the network device 111. The sentinel serve 127 may communicate with the computing device 108 and/or other computing devices using various protocols such as, for example, HTTP, SOAP, REST, UDP, TCP, and/or other protocols for communicating data over the network 109.

Next, a general description of the operation of the various components of the networked environment 100 is provided. To begin, an operator defines the instances of the marking service 121 and the sentinel service 127 to be used in the service data 184. The definitions may include a network address, authentication data, a location of the computing device on which the service is executing, a priority of the service, and other possible information about each service as can be appreciated.

Additionally, the operator may provide coding rules 131 to the threat management service 182. The coding rules 131 identify specific tables or types of tables to be created and/or modified with decoy data, as well as the type(s) of marking to be performed for a given table. The marking may include specific decoy data to be inserted into the tables 138 and/or responses, rules for modifying pre-existing data to be decoy data, rules for generating decoy data, rules for creating tables 138, and/or other marking techniques as can be appreciated. The coding rules 131 and the service data 184 may be input to a user interface of the threat management service 182 or predefined elsewhere and imported into the data store 181.

As a non-limiting example, one of the coding rules 131 may be to identify tables containing confidential information such as name, address, telephone number, geolocation, uniquely identifying information, personal non-public information, and personally identifiable information. The rule for these tables may further include direction to add a column to the table of non-decoy, "actual" data to include credit card information as decoy data. The credit card information may be decoy data provided by credit card issuers and/or the decoy credit card numbers may be locally generated. Locally generated numbers may be created randomly, from a credit card number algorithm, and/or using other techniques as can be appreciated. In some embodiments, the locally generated credit card numbers may contain a valid credit card number check digit such that upon a cursory validation of the number, the credit card number would appear to be valid.

The threat management service 182 may use the coding rules 131 to generate signature data 135. The signature data 135 may be used by the instances of the sentinel service 127 in order to detect decoy data and may comprise, for example, text strings, checksums, hash values, metadata, detection rules, and/or other types of identification data as can be appreciated. As a non-limiting example, the coding rules 131 may comprise an instruction to insert a decoy credit card number of 4123 0987 5678 7890 into a table associated with customer order data. The signature data may contain the text string "4123 0987 5678 7890" to be matched, a cyclical redundancy check (CRC) checksum of the text string, a detection rule that a sum of the digits of the credit card number are a particular value, and/or other possible criteria for detecting decoy data as can be appreciated.

The threat management service may distribute the coding rules 131 to the various instances of the marking service 121, as well as distribute the signature data 135 to the various instances of the sentinel service 127, the instances of the services being defined in the service data 184. The distribution may occur using HTTP, HTTP over Transport Layer Security (TLS)/Secure Sockets Layer (SSL), File Transfer Protocol (FTP), FTP Secure (FTPS), or other data transfer protocols as can be appreciated. The distribution may further use authentication credentials to confirm the identity of the instances of the marking service 121 and sentinel service 127. In some embodiments, only portions of the coding rules 131 and/or the signature data 135 are distributed to the respective services based at least upon location and/or function of the computing device in which the service is executing. As a non-limiting example, a coding rule associated with inserting decoy data into tables of customer information may not be applicable for a computing device without tables containing customer information.

Thereafter, the instances of the marking service 121 may begin an examination of the tables 138 to identify and/or create tables conforming to the criteria of the coding rules 131 and include decoy data in responses to access of the tables accordingly. To this end, the marking service 121 may insert the decoy data into the table to be included in responses, and/or the marking service 121 may insert decoy data only into the responses without insertion into the table.

In some embodiments, the decoy data inserted may be unique to the data store 112, unique to a user accessing the tables 138, unique to a client device 106, unique to a particular access of the tables 138, and/or uniquely identifiable upon another basis as can be appreciated. Among other possible benefits, the use of uniquely identifiable decoy data may aid in tracing the decoy data to the original source. The marking service 121 may identify pre-existing tables 138 based upon metadata for the tables 138, examination of the data values within the tables 138, and/or other possible techniques. As a non-limiting, the coding rules 131 may instruct the marking service 121 to identify ones of the tables 138 having customer names, where none of the customer names include a middle initial. The coding rules 131 may further instruct the marking service 121 to insert decoy data of randomly generated letters as middle initials into the customer name field for responses to access of those tables 138 having a customer name.

Activities of the identification and marking performed by the marking service 121 may be stored in the transaction log 133. The transaction log 133 may be periodically transmitted to the threat management service 182 for collection. In some embodiments, the signature data 135 may be adjusted based upon the transaction log 133. For example, if the signature data 135 includes detection techniques for decoy data that the transaction log 133 indicates has never been used, the particular detection technique may be removed from the signature data 135 until the transaction log 133 indicates the decoy data has actually been applied.

The sentinel service 127 may be executed in the computing device 103, the client device 106, the network device 111, and/or other computing devices in order to detect the presence of decoy data outside the data store 112 or other data stores in which it was placed. The decoy data may be identified based upon a comparison with portions of the signature data 135. The signature data 135 may contain various type of information that may be employed to positively identify a given piece of data as being decoy data.

The sentinel service 127 may examine data present in memory, in a table of the data store 112 other than where it was placed, stored in non-volatile storage, transiting a network interface, and/or other locations of the computing devices in which the sentinel service 127 is executing. The decoy data inserted into the tables 138 may produce few "false positive" alerts in the sentinel service 127 based upon the assumption that applications having authority to access tables 138 marked with decoy data may access data using operations that do not produce decoy data in the results. One possible type of operation may be queries that request only specific, predefined types of information that would not include the decoy data inserted.

As a non-limiting example, a column of credit card information has been previously added as decoy data to a table of customer information. Applications having authority to access the table of customer information may not request the credit card data from the table because such applications would not have expected credit card data within a table of customer information. In the event an application did routinely retrieve all the columns of data from the table, the application may be instructed to discard credit card information for this particular table.

As another possible type of operation, an application may access the tables 138 through an API of the data store manager 124 that limits the number of records returned for the access, but the records contain no decoy data. Another API for the data store manager 124 may be available that does not limit the number of records returned from the tables 138, but which ensures decoy data is present in the returned results. As a non-limiting example, an attribute associated with credit card information has been previously added as decoy data to a table of customer information. An application using the record-limited API would not receive the credit card information as part of a query for all attributes of the table. On the other hand, an application using the unlimited API would receive the credit card information as part of a query for all attributes of the table. An application that had not been previously instructed to filter the results from this unlimited API would generate an alarm in the sentinel service 127 based upon the presence of decoy data outside the data store 112.

Based upon an alarm, the sentinel service 127 may take a variety of possible actions as may be defined in the signature data 135 or in other locations accessible to the sentinel service 127. The actions may include, for example, logging the details about the circumstances of the detected incident, transmitting an alert to the threat management service 182, quarantine the data associated with the decoy data, terminating the process accessing the decoy data, and/or other possible actions as can be appreciated. The action(s) taken may depend in part based upon the particular decoy data detected, the location of the computing device in which the sentinel service 127 is executing, the priority of the computing device in which the sentinel service 127 is executing, and/or other possible criteria.

As a non-limiting example, the sentinel service 127 executing in a network device 111 near the source of the decoy data may simply transmit an alert for detected decoy data on a network interface because false-positives at this location may be high and the risk of consequential damage is low due to the location. However, a network device 111 operating at an exit point of a network 109 may choose to interrupt the data communication containing the decoy data, as well as non-decoy data, because of the high risk that the data access may not have been authorized.

Figure 2:
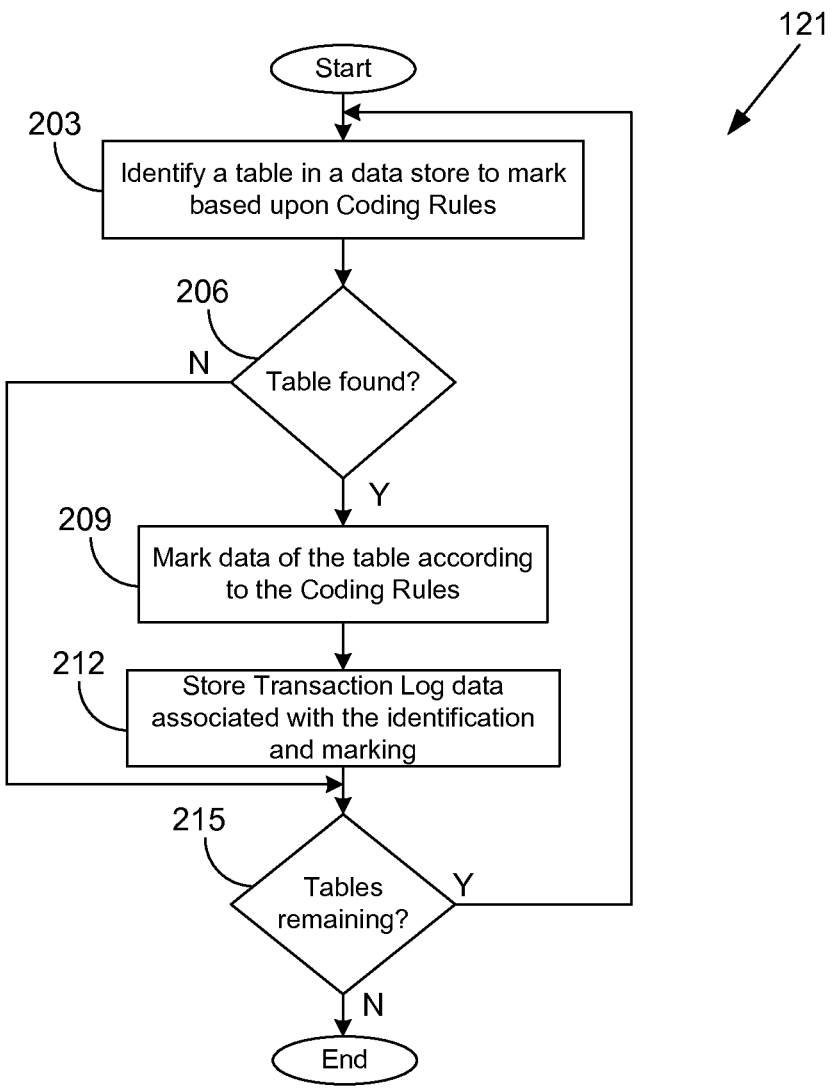
FIG. 2 is a flowchart illustrating one example of functionality implemented as portions of a marking service executed in a computing device in the networked environment of FIG. 1 according to various embodiments of the present disclosure.

Referring next to FIG. 2, shown is a flowchart that provides one example of the operation of a portion of the marking service 121 according to various embodiments. It is understood that the flowchart of FIG. 2 provides merely an example of the many different types of functional arrangements that may be employed to implement the operation of the portion of the marking service 121 as described herein. As an alternative, the flowchart of FIG. 2 may be viewed as depicting an example of steps of a method implemented in the computing device 103 (FIG. 1) according to one or more embodiments.

This portion of the execution of the marking service 121 may be executed based on obtaining coding rules 131 (FIG. 1) with which to identify and mark tables in the data store 112 (FIG. 1). Beginning with block 203, the marking service may begin an examination of the tables 138 to identify those conforming to the criteria of the coding rules 131. The marking service 121 may identify such tables 138 (FIG. 1) based upon metadata for the tables 138, examination of the data values within the tables 138, and/or other possible techniques.

Next, in block 206, the marking service determines if one of the tables 138 matches the criteria of the coding rules 131. If the table is not a match, execution of the marking service 121 proceeds to block 215. Alternatively, if the table is a match, in block 209, the marking service 121 marks data of the table with decoy data according to the coding rules 131. As discussed previously, the marking service 121 may insert the decoy data into the table to be included in responses to access of the table, and/or the marking service 121 insert decoy data only into the responses without insertion into the table. The marking may include predefined decoy data inserted into the tables, rules for modifying pre-existing data to be decoy data, rules for generating decoy data, and/or other marking techniques as can be appreciated.

Then, in block 212, the marking service 121 may store a transaction log 133 (FIG. 1) of data associated with the identification and marking of the table. Such data may include the criteria of the coding rules 131 used to identify the table, decoy data inserted into the table, any prior value in the table before being modified with decoy data, and/or other possible data. Subsequently, in block 215, the marking service 121 determines if there are any further tables remaining that have not been examined and/or marked. If no more tables remain, this portion of the execution of the marking service 121 ends as shown. Alternatively, if other tables do remain, execution of the marking service returns to block 203.

Figure 3:
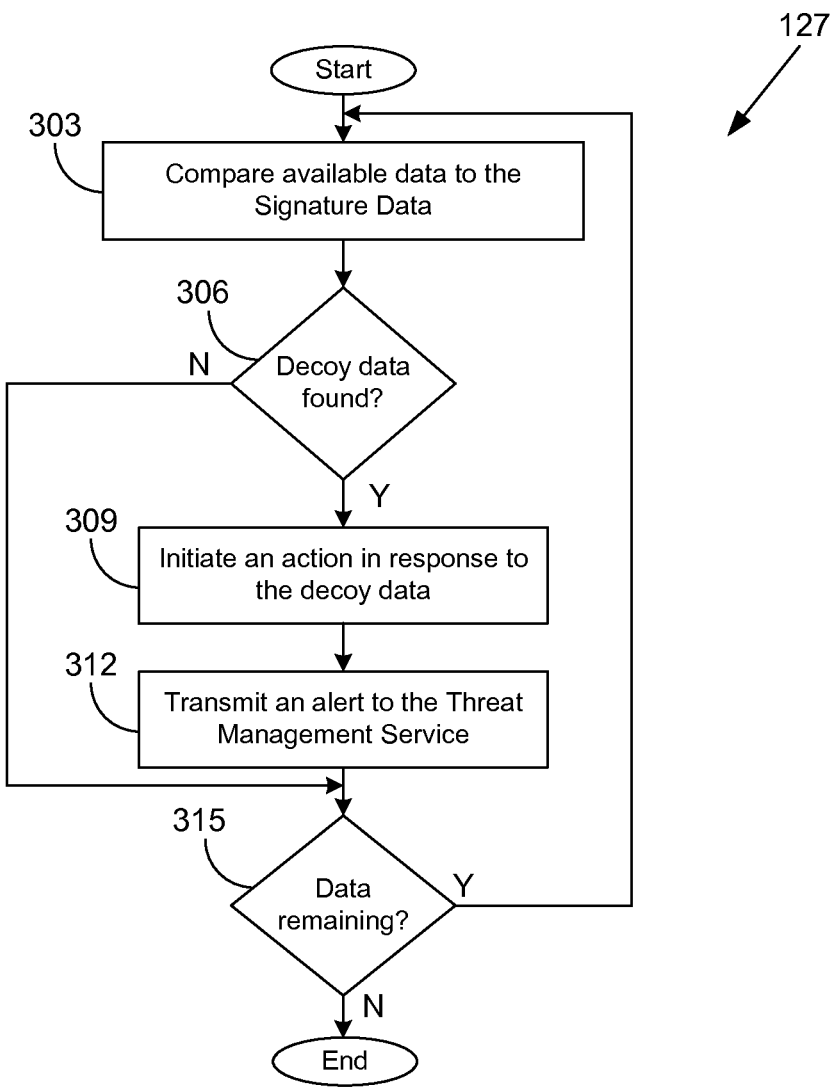
FIG. 3 is a flowchart illustrating one example of functionality implemented as portions of a sentinel service executed in a computing device in the networked environment of FIG. 1 according to various embodiments of the present disclosure.

Turning now to FIG. 3, shown is a flowchart that provides one example of the operation of a portion of the sentinel service 127 according to various embodiments. It is understood that the flowchart of FIG. 3 provides merely an example of the many different types of functional arrangements that may be employed to implement the operation of the portion of the sentinel service 127 as described herein. As an alternative, the flowchart of FIG. 3 may be viewed as depicting an example of steps of a method implemented in the computing device 103 (FIG. 1) according to one or more embodiments.

This portion of the execution of the sentinel service 127 may be executed based on the presence of unexamined data and/or an update to the signature data 135 (FIG. 1). Beginning with block 303, the sentinel service 127 examines available data in order to detect the presence of decoy data outside the data store 112 (FIG. 1) or other data stores in which it was placed. The decoy data may be identified based upon a comparison with portions of the signature data 135. The signature data 135 may contain various types of information that may be employed to positively identify a given piece of data as being decoy data. The sentinel service 127 may examine data present in memory, in a table of the data store 112 other than where it was placed, stored in non-volatile storage, transiting a network interface, and/or other locations of the computing devices in which the sentinel service 127 is executing.

Next, in block 306, the sentinel service 127 determines if the data under examination matches the signature data 135, thus indicating the presence of decoy data. If the data under examination does not match the signature data 135, execution of the sentinel service proceeds to block 315. Alternatively, if the data under examination does match the signature data, in block 309, the sentinel service initiates one or more actions in response to the decoy data.

The actions may include, for example, logging the details about the circumstances of the detected incident, quarantining the data associated with the decoy data, terminating the process accessing the decoy data, and/or other possible actions as can be appreciated. The action(s) taken may depend in part based upon the particular decoy data detected, the location of the computing device in which the sentinel service 127 is executing, the priority of the computing device in which the sentinel service 127 is executing, and/or other possible criteria. Next, in block 312, the sentinel service 127 may transmit an alarm to the threat management service 182 (FIG. 1) and/or other computing device on the network 109 (FIG. 1).

Then, in block 315, the sentinel service 127 determines whether additional data remains to be compared to the signature data 135. If no further data exists, this portion of the execution of the sentinel service 127 ends as shown. This portion of the sentinel service 127 may be reactivated upon receiving additional data to examine and/or changes to the signature data 135. Alternatively, if additional data does exist to examine, execution of this portion of the sentinel service returns to block 303.

Figure 4:
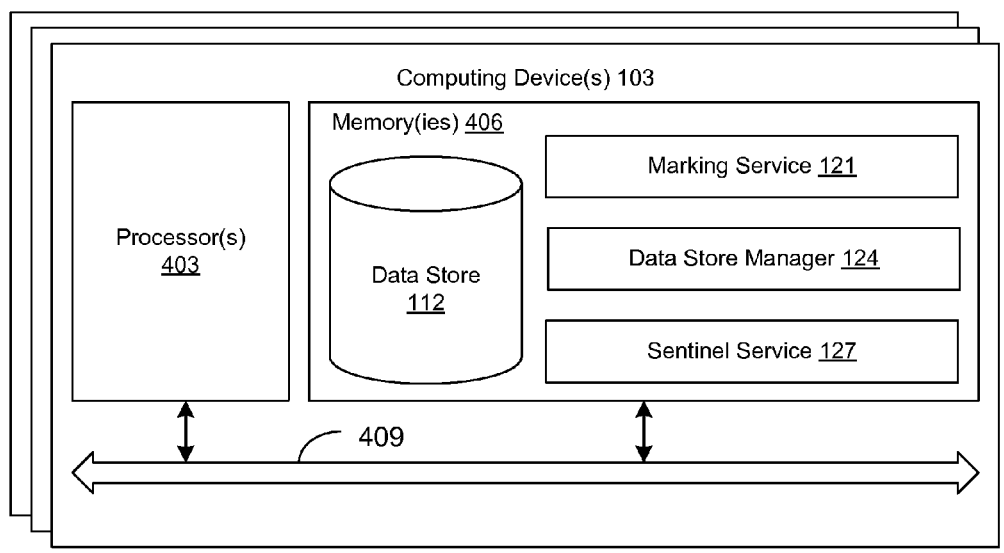
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the marking service 121, the data store manager 124, the sentinel service 127, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the marking service 121, the data store manager 124, the sentinel service 127, threat management service 182, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the marking service 121 and the sentinel service 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the marking service 121, the data store manager 124, the sentinel service 127, and threat management service 182, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a network device, the program, when executed, causing the at least one computing device to at least:
   obtain signature data indicating decoy data as a column of data appended to a plurality of non-decoy data;
   detect the decoy data among the plurality of non-decoy data by determining whether the column of data is included in a response to an access of a data store, the response being communicated via the network device;
   perform, responsive to the column of data being included in the response, an action based at least in part on a position of the network device in a network; and
   wherein the action comprises at least one of generating an alarm, quarantining at least a portion of the response, or logging a detection of the decoy data.

2. The non-transitory computer-readable medium of claim 1, wherein the action is based on a proximity of the network device to at least one of a source of the decoy data or a network endpoint.

3. The non-transitory computer-readable medium of claim 1, wherein the action is further based at least in part on a priority of the network device or a type of the decoy data.

4. The non-transitory computer-readable medium of claim 1, wherein detecting the decoy data comprises accessing a memory of the network device, the memory comprising volatile and non-volatile storage.

5. A system, comprising:
   at least one computing device connected to a network, the at least one computing device configured to at least:

obtain signature data describing decoy data as a column of data appended to a plurality of non-decoy data inserted by a marking service;

detect, based at least in part on the signature data, decoy data via a scan of a plurality of data communications of the network to determine whether the column of data is included in a response to an access of a data store, the response being included in the plurality of data communications; and perform an action in response to detecting the column of data in the response, the action being based at least in part on at least one of: an indication of the action in the signature data, a position of the at least one computing device in the network, a type of the decoy data, or a priority of the at least one computing device.

6. The system of claim 5, wherein the scan further comprises scanning a memory of the at least one computing device, the memory comprising volatile and non-volatile storage.

7. The system of claim 5, wherein the signature data describes the decoy data according to at least one of a text string, a hash value, a checksum, a column of data, a digital watermark, or a steganographic mark.

8. The system of claim 5, wherein the at least one computing device comprises at least one network device, the communications being communicated via the at least one network device.

9. The system of claim 8, wherein the action is based on a proximity of the at least one network device to at least one of a source of the communications or a network endpoint.

10. The system of claim 5, wherein the signature data indicates the decoy data as a string, and wherein detecting the decoy data comprises applying a string matching algorithm to at least a portion of the communications.

11. The system of claim 5, wherein the action comprises at least one of generating an alarm, quarantining at least a portion of the response, terminating a process associated with accessing the decoy data, or logging a detection of the decoy data.

12. The system of claim 11, wherein generating the alarm comprises forwarding the alarm to a reporting station.

13. The system of claim 11, wherein the alarm indicates at least one of an identifier of the at least one computing device, an identifier of the decoy data, an indication of the action, or an indication of a result of the action.

14. A method, comprising:

obtaining, by at least one computing device, signature data describing decoy data as a column of data appended to a plurality of non-decoy data inserted by a marking service;

detecting, by the at least one computing device, based at least in part on the signature data, the decoy data amongst the plurality of non-decoy data by determining whether the column of data is included in a response to an access of a data store by at least one other computing device; and forwarding, by the at least one computing device, an alarm to a reporting station in response to detecting the column of data.

15. The method of claim 14, wherein the non-decoy data comprises confidential information.

16. The method of claim 14, wherein the signature data indicates the decoy data as a string, and wherein detecting the decoy data comprises applying a string matching algorithm to at least a portion of the response.

17. The method of claim 14, wherein the at least one computing device comprises at least one network device, the response being communicated to the at least one other computing device via the at least one network device.

18. The method of claim 14, further comprising performing, by the at least one computing device, an action in response to detecting the decoy data, the action comprising at least one of: quarantining at least a portion of the response, terminating a process associated with accessing the decoy data, logging a detection of the decoy data, or preventing a communication of the response to the at least one other computing device.

19. The method of claim 18, further comprising determining, by the at least one computing device, the action based at least in part on a position of the at least one computing device in the network.

20. The method of claim 19, wherein the action is based on a proximity of the network device to at least one of a source of the decoy data or a network endpoint.

* * * * *